United States Patent

[11] 3,615,676

[72] Inventors William L. McKown
 St. Louis Park;
 Philip K. Zietlow, Wayzata, both of Minn.
[21] Appl. No. 692,630
[22] Filed Dec. 18, 1967
[45] Patented Oct. 26, 1971
[73] Assignee General Mills, Inc.

[54] PROCESS FOR SUGAR COATING READY-TO-EAT CEREAL
 10 Claims, 2 Drawing Figs.

[52] U.S. Cl. .................................................. 99/83
[51] Int. Cl. .................................................. A23l 1/10
[50] Field of Search .......................... 99/83, 166; 107/54, 54.7

[56] References Cited
 UNITED STATES PATENTS

| | | | |
|---|---|---|---|
| 2,607,691 | 8/1952 | Bettman .................. | 99/83 |
| 2,868,647 | 1/1959 | Vollink ..................... | 99/83 |
| 3,094,947 | 6/1963 | Green et al. ............. | 99/83 X |
| 2,518,247 | 8/1950 | Nairn ....................... | 99/81 |
| 3,184,316 | 5/1965 | Doan ....................... | 99/83 |
| 3,484,250 | 12/1969 | Vollink et al. ............ | 99/83 |

OTHER REFERENCES

The Condensed Chemical Dictionary–Reinhold Publishing Corp. N.Y. 1956 page 997.

*Primary Examiner*—Raymond N. Jones
*Attorneys*—Anthony A. Juettner, William C. Babcock and L. Meroy Lillehaugen

ABSTRACT: A sweetened, nonsticky, ready-to-eat cereal product and process for forming it. Crystalline sugar is applied to the surface of cereal pieces, and caused to adhere thereto by moistening the cereal pieces with a solution formed of water and an edible binding agent.

PATENTED OCT 26 1971
3,615,676
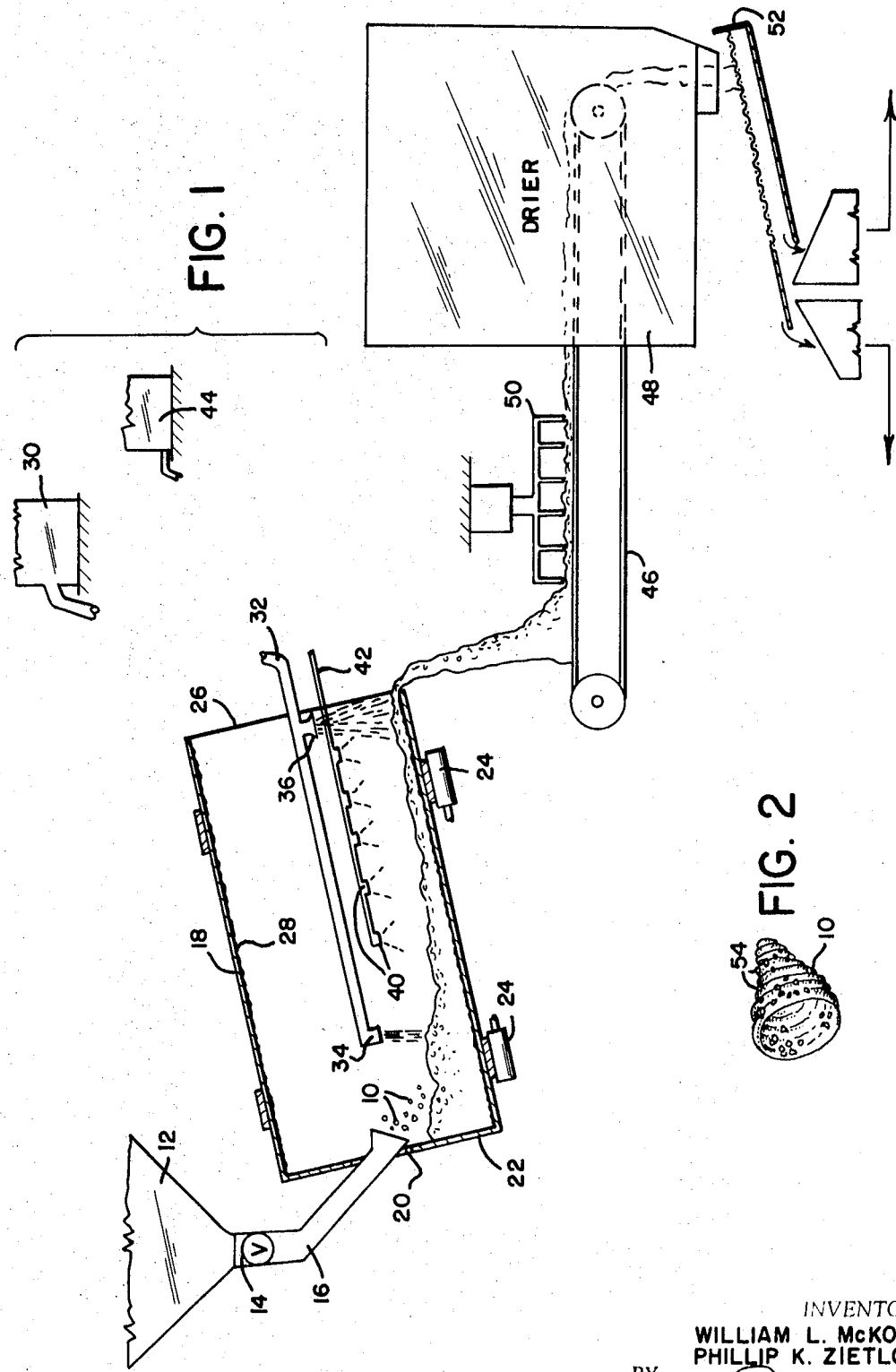
FIG. 1
FIG. 2
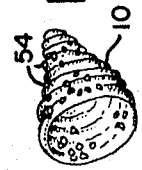
INVENTOR.
WILLIAM L. McKOWN
PHILLIP K. ZIETLOW
BY L. MacRay Lillehaugen
ATTORNEY

PROCESS FOR SUGAR COATING READY-TO-EAT CEREAL

The present invention relates to an edible, sweetened cereal food product, and more specifically to a process for producing a nonsticky cereal product covered or coated with granules or crystalline sugar which are adhered to the surface of the cereal product by an edible binding agent.

Sweetened cereal products, such as ready-to-eat breakfast cereals, have been known in the art for some time. It has been found that the palatability, as well as the marketability, of some breakfast cereals can be enhanced by applying a sweetening ingredient of some type onto the surface of the cereal piece or body, or by impregnating the cereal piece with the sweetening ingredient. Sugar is usually used as part or all of the sweetening ingredient. As known to those skilled in the art, sugar is often used in one of two forms, either in a crystalline state, or in a noncrystalline or glassy state. While in its crystalline state, sugar is substantially nonsticky and nonhygroscopic; in its glassy state on the other hand, sugar is relatively sticky and hygroscopic. Crystalline sugar can be readily converted to a glassy state, and vice versa, by procedures well known in the art.

According to the known prior art, some cereals have been commonly sweetened by using sugar in its glassy, noncrystalline state. This has been accomplished by forming a sugar syrup having a relatively high moisture content, e.g. up to 35 percent, and applying it as a thin film over the surface of the cereal piece. In certain other instances, the cereal pieces have been coated with a sugar composition which contains only a small amount of moisture, e.g. 5 percent or less, the resulting cereal pieces are thus covered with a glaze-type coating. Sugar coatings of these types are usually glassy in nature, as contrasted to a crystalline appearance and structure, and are very hygroscopic. In still other instances, both crystalline and noncrystalline sugar have been used; a sugar syrup for example, is used to coat the cereal piece, and sugar crystals are adhered to the cereal piece by means of the syrup. To the best of applicants' knowledge, sugar in its crystalline state has not been used along for sweetening a cereal product. Perhaps the foremost reason for this is that it is difficult to cause the crystals to stick or adhere to the surface of the cereal pieces without changing its crystalline nature. In the past, a sugar syrup has been used in combination with the sugar crystals for this purpose.

It has been found that the prior art products, and processes for forming them, have not been completely satisfactory. One of the primary problems encountered with sweetened cereals of the glassy type, is the hygroscopic nature of the resulting product. In other words, pure sugar when in the noncrystalline state normally becomes quite sticky and tacky in a humid environment, because it absorbs moisture quite readily; thus, the cereal pieces tend to agglomerate or stick together to an objectionable degree during storage. Moreover, the increased moisture might cause and/or hasten deterioration of the cereal base itself. Thus, the resulting product has not exhibited the optimum characteristics as to storage stability, appearance, and palatability. While various steps have been taken to overcome these problems, by utilizing unique packaging techniques or by adding certain ingredients to the syrup for example, the results have not been entirely satisfactory.

Accordingly, one object of the present invention is to provide a novel process for making an improved sweetened cereal food product.

Another object is to provide a process for forming a sweetened breakfast cereal product which is covered or coated with granules of crystalline sugar.

A further object is to provide a process for forming a sweetened substantially nonhygroscopic cereal product which remains nonsticky and nontacky regardless of the ambient humidity conditions.

A still further object is to provide an improved sweetened, ready-to-eat cereal product.

Other objects and advantages will become apparent from a consideration of the following specification and accompanying drawings.

Briefly, the invention involves forming a sweetened cereal food product by covering individual cereal pieces with granules of relatively coarse crystalline sugar. The granules are caused to adhere to the surface of the cereal piece by combining an edible, nonsugar, binding agent with water, and applying the mixture onto the cereal pieces in such a manner that the sugar granules adhere to the cereal pieces. The sugar coated cereal pieces are then dried to lower their moisture content, sifted to remove loose pieces of sugar, and packaged, or stored for future packaging and consumption.

The invention will be better understood by reference to the following drawings wherein:

FIG. 1 is a schematic view illustrating a preferred continuous process for producing a sweetened cereal product; and FIG. 2 illustrates a cereal piece with sugar crystals adhered to its surfaces.

The present invention can be carried out by using a variety of cereal grains, such as rice, wheat, oats, corn, barley, or any combination of two or more of the grains, as the base material for forming cereal pieces having a variety of shapes and sizes. As known, various techniques have been developed for forming the cereal grain into a dry cereal piece having a prescribed shape, texture, and size. Cereal products having a puffed, flaked or shredded form for example, are well known in the art; moreover, it has become well known to form cereal grains into pieces having unique and different configurations as well, such as doughnut shapes, cone shapes, heart shapes, and the like.

A prescribed amount of dry cereal pieces and a prescribed amount of crystalline sugar are introduced into a container so that they can be intimately mixed together. While it has been found that different crystalline sugars can be used with satisfactory results, it is preferred that pure crystalline sucrose having a relatively coarse granulation be used. As known in the art, "sanding" sugar is oftentimes used where a relatively coarse granulation is desired. Preferably, the size of the crystals should not be too small. If the crystals are too small, the product does not have the desired crystalline appearance. For best results, it is preferred that the particle size be such that at least 90 percent is retained on a 40-mesh screen. By using crystals which are relatively large, it has been found that a smaller amount of sugar is g generally needed than when a noncrystalline sugar, e.g. syrup, is used to coat the cereal piece. This is perhaps explained by the fact that more surface area of the sugar crystals are exposed, thus enabling the consumer to realize a "sweetened" effect which is equivalent to a higher percent of a sugar syrup coating. It should be realized, of course, that a certain amount of fines or powdery sugar can be tolerated without deleterious results. Enough sugar should be added to the mixture so that about 15–60 percent, and preferably about 30–50 percent of the mixture is comprised of sugar. In many instances of course, the cereal piece includes some sugar in its formulation; therefore, the total sugar content might be somewhat higher.

The cereal pieces and the sugar crystals are mixed together by appropriate means so that the pieces and the crystals are interspersed with each other. The sugar crystals are caused to adhere to the cereal during the mixing operation by applying a solution, preferably comprised of water and an edible, nonsugar binding agent into the surface(s) of the cereal pieces in the mixing container. It has been discovered that a number of ingredients when mixed with water serve as an excellent binding agent for causing the crystalline sugar granules to adhere to the cereal pieces. Such agents include water-soluble gelatin, guar gum, pregelatinized starch, sodium carboxymethylcellulose, methylcellulose, as well as other edible nonsugar binding ingredients, such as edible shellack which might be combined with an appropriate organic solvent. The solution is formed by combining about 0.5–25 percent by weight of the binding agent with water After mixing the water and the binding agent together, the solution is applied to the cereal pieces, by spraying for example, so that the surfaces of the cereal pieces are moistened. After a short period of time, the surface of the pieces becomes sticky or tacky. As the sugar crystals contact the moistened and somewhat tacky surface of the cereal pieces, during the mixing operation, they are caused to adhere thereto.

The amount of moisture applied to the cereal pieces should not be too great; if too much moisture is applied, the sugar crystals might dissolve, and the cereal pieces might become soggy and difficult to subsequently dry. On the other hand, if too little moisture is applied, the sugar crystals will not adhere properly to the cereal pieces. It has been found that the moisture content of the pieces when moistened should range from about 5–20 percent, and preferably about 7–9 percent. Normally, the cereal pieces will have a moisture content of about 1–3 percent when introduced into the mixing container.

After mixing the ingredients together for a predetermined amount of time, the moistened sugar-coated cereal pieces are dried to reduce their moisture content to about 0.5–3 percent. Various drying procedures and techniques can be satisfactorily employed. A suitable product can be obtained by drying at room temperature for a prescribed period of time; if time is important however, the pieces can be dried at an elevated temperature, e.g. 175°–300° F. by appropriate means.

After drying, the sugar-coated cereal pieces are subjected to a classifying operation so that any loose pieces of sugar are removed, for subsequent reuse. The final product should have a sugar content ranging from about 15–50 percent by weight, and preferably it should be about 30–45 percent. The final product is then packaged immediately or stored for future packaging.

The present invention can be readily practiced on a batch basis, or if desired, a continuous operation might be employed. For purposes of illustration, FIG. 1 depicts the invention by utilizing a continuous operation. As shown, dry cereal pieces designated generally by reference numeral 10, are continuously fed directly from a storage bin 12 through a control valve 14 and conduit 16, into an enrober 18, having an opening 20 in a first end 22. The enrober 18 is caused to rotate about its longitudinal axis by rollers 24, which are driven by appropriate means (not shown), and it is inclined slightly so that its longitudinal axis defines an angle with respect to a horizontal plane. The opposite end 26 of the enrober is uncovered. The inside surface 28 of the enrober is somewhat roughened to aid in mixing and moving material deposited into it.

Crystalline sucrose, having a relatively coarse granulation, is introduced into the enrober 18 from a source 30, through a conduit 32 having an opening 34 at one end which is positioned within the enrober proximate the end 22, and a nozzle 36 positioned proximate the enrober end 26. Preferably, the sugar is blown under pressure into the enrober by appropriate means (not shown). The sugar generally drops downwardly onto the cereal pieces proximate the end 22, whereas the nozzle 36 disperses the sugar crystals onto the moistened pieces near the open end 26 over a somewhat larger area. This arrangement distributes the sugar onto the cereal pieces 10 at two different points within the enrober. As the enrober 18 is caused to rotate about its axis, the cereal pieces and the sugar granules introduced through the opening 34 are mixed together and caused to move toward the open end 26 of the enrober, at which point the additional sugar is applied through nozzle 36 just before the cereal pieces exit from the enrober.

The surfaces of the cereal pieces are moistened by spraying a solution onto them through a plurality of nozzles 40 mounted in a conduit 42 which projects into the open end of the enrober. The conduit 42 is connected to a source 44, which contains the solution, and a pump (not shown) is provided for forcing the solution through the nozzles 40 onto the cereal pieces. The solution should preferably be introduced as a fine spray; nozzles having the desired spray producing characteristics are commercially available and will not be described in detail. The solution is comprised of water, and a small amount of a selected edible biding agent which is mixed with the water. The amount of binding agent included in the solution will vary depending upon the specific ingredient used, the desired concentration of the solution, and the like.

As the mixture of cereal pieces and sugar crystals flows past the nozzles 40 toward the enrober end 26, they are moistened with the spray droplets, their surfaces become somewhat sticky or tacky, and the crystals adhere to the surfaces of the cereal pieces. The moistened cereal pieces are removed from the enrober 18 and deposited onto a moving conveyor 46, which transfers them into a drier 48 where they are dried. If desired, a distributing device designated generally at 50 can be provided for leveling the cereal pieces as they are deposited onto the moving conveyor belt. As disclosed, the distributor moves in a direction transverse to the direction of movement of the conveyor belt 46.

After the cereal pieces are discharged from the drier 48, they are deposited on a sifter 52 so that any loose granules of sugar are removed from the mass of cereal pieces. The cereal pieces are either packaged or stored, while the sugar granules are returned to the storage bin 30 for subsequent reuse.

FIG. 2 illustrates a cone-shaped cereal piece 10 having a plurality of sugar crystals 54 randomly adhered on its surfaces.

The invention will be better understood by reference to the following examples:

EXAMPLE I

A cereal mixture was formed by combining and mixing 10 oz. of expanded cereal pieces with 12 oz. of crystalline sucrose in a mixing container, such as a rotating enrober. The granulation of the sucrose was such that the major portion of it was retained on a 40-mesh screen. After mixing the cereal pieces and sucrose crystals together, a solution formed of water and about 7.5 percent gelatin having a grade of 250 Bloom, was sprayed onto the cereal-sugar mixture. A sprayer was used which produced a fine mist, at a rate of about 140 milliliters per minute. Spraying was continued for about 30 seconds, after which mixing was continued for an additional 30 seconds during which time the moistened cereal pieces became somewhat sticky and tacky. An additional amount of the solution was sprayed onto the mixture for an additional 15 seconds, after which an additional 6 oz. of crystalline sucrose were sprinkled onto the mixture. The resulting cereal pieces had a moisture content of about 8 percent, and they had a relatively uniform coating of crystalline sucrose adherred to their surfaces. The cereal pieces were then air dried at room temperature so that their moisture content was reduced to about 1.0 percent. After drying, the pieces were sifted on a vibratory sifter to remove loose crystals of sucrose. The resulting cereal pieces were comprised of about 39 percent by weight sucrose crystals, they had a very attractive and appetizing appearance, they remained substantially nonsticky after an extended storage period, the sucrose crystals readily dissolved when combined with milk in a cereal bowl, and they had a delicious flavor.

EXAMPLE II

Example I was repeated except that 16 oz. of cereal pieces were combined and mixed with 11 oz. of crystalline sucrose. A 7.5 percent gelatin solution was sprayed onto the mixture in the same manner set forth in example I, after which an additional 5 oz. of sucrose were sprinkled onto the moistened mixture. The resulting product when dried and sifted had a coating of about 36 percent by weight of sucrose crystals.

EXAMPLE III

Sixteen ounces of puffed cereal pieces were combined and mixed with 12 oz. of crystalline sucrose in a rotating enrober. The resulting mixture was sprayed with a solution comprised of water and 10 percent corn starch. The starch was produced by American Maize Products of New York, N.Y. and was identified as Instant Amino-gum 129–A corn starch. The procedure followed was substantially the same as that described in Example I, except that the solution was sprayed on at a rate of about 130 ml. per minute. After applying an additional 6 oz. of sucrose, the cereal pieces, which had a moisture content of about 8 percent, were oven dried at about 180° F. so that their moisture level was reduced to about 1.5 percent. After removing the loose sugar crystals by sifting, the cereal pieces were covered with about 40 percent by weight of crystalline sucrose.

EXAMPLE IV

The general procedure set forth in example I was followed except that 16 oz. of cereal pieces were mixed with 11 oz. of crystalline sucrose. A solution comprised of water and 2.0 percent sodium carboxymethylcellulose was sprayed onto the cereal pieces at a rate of about 140 ml. per min. The carboxymethylcellulose was obtained from Hercules Incorporated of Wilmington, Del., and was identified as CMC-7LP. After sprinkling an additional 5 oz. of crystalline sugar onto the cereal pieces, their moisture content was reduced from about 8 percent to about 1.0 percent. The pieces were then sifted to remove the excess sugar; when sifted they were coated with about 35 percent by weight of sugar crystals.

EXAMPLE V

A sugar coated cereal was produced on a continuous basis by continuously feeding cereal pieces into the rear end of a rotating enrober inclined at a slight angle, at a feed rate of about 1.5 lb. per min. Crystalline sucrose was introduced into the enrober at two points; at a first point proximate the rear end of the enrober at a feed rate of about 1.0 lb. per min., and at a second point proximate the opposite end of the enrober at a feed rate of about 0.5 lbs. per min. A 2.0 percent solution of carboxymethylcellulose and water having a temperature of about 70° F. was sprayed onto the cereal pieces through a plurality of nozzles projecting into the enrober and positioned between the two sugar discharge openings. The moisture content of the cereal pieces was raised from about 1.0 percent to about 9.0 percent during the moistening operation. As the enrober rotated about its axis, the moistened cereal pieces became somewhat sticky and tacky, and the sugar crystals introduced through the first opening adhered to the surface of the moistened cereal pieces. As the cereal-sugar mass moved past the second sugar discharge opening they were sprinkled with an additional amount of sugar crystals.

The moistened cereal pieces were discharged from the enrober onto a conveyor belt which transferred them into a drier or oven operating at a temperature of about 200° F. The dried cereal pieces were removed from the drier having a moisture content of about 1.0 percent, and were deposited on a vibratory sifter which removed the loose sugar granules from the cereal mass. The cereal pieces were cooled and stored for future packaging, while the loose sugar crystals were recycled to the sucrose storage bin for reuse. The resulting cereal pieces had a coating of about 33 percent by weight of crystalline sucrose.

EXAMPLE VI

Example V was repeated except that the amount of carboxymethylcellulose in the solution was increased to 4.0 percent. The resulting cereal pieces had a sugar coating of about 37 percent. In other respects it was considered equivalent to or better than the product formed in example V.

The above described invention results in a sweetened cereal product having excellent appearance, eating, and storage characteristics. By using sugar which is in the crystalline state, rather than a sugar syrup solution, many of the disadvantages encountered with the known prior art procedures are overcome. Samples of the product produced when stored under various humidity and temperature conditions have exhibited exceptional storage capabilities, with little or no stickiness and the resulting agglomeration of cereal pieces to each other, a problem which is frequently encountered with sweetened cereals currently available.

In the above description, a disclosure of the principles of this invention is presented, together with some of the specific examples by which the invention might be carried out.

Now therefore, we claim:

1. A process for making a sweetened, nonsticky, ready-to-eat cereal product which comprises forming an admixture of crystalline sugar and substantially dry cereal pieces, applying a solution comprised of water and an edible, nonsugar binding agent in an amount sufficient to cause the crystalline sugar to adhere to the cereal pieces, onto the admixture, mixing said moistened cereal pieces and sugar until said moistened pieces become tacky, applying an additional amount of said solution onto the admixture after it has been mixed for a period of time so that the total moisture content of said pieces is raised to about 5–20 percent, applying an additional amount of crystalline sugar to the admixture, drying the cereal pieces to a moisture content of 0.5–3.0 percent, and separating loose pieces of crystalline sugar from the covered cereal pieces.

2. A process for making a sweetened ready-to-eat cereal product which comprises applying sugar granules onto the surface of individual substantially dry cereal pieces and causing said granules to adhere to the surface of said pieces by moistening the pieces with a water solution containing an edible, nonsugar binding agent, the moisture content of said moistened cereal pieces ranging from 5–20 percent and reducing the moisture content of the cereal pieces to a range of 0.5 to 3.0 percent by drying them to such an extent that they do not adhere to each other when stored.

3. A process for making a sweetened, nonsticky ready-to-eat cereal product which comprises introducing substantially dry cereal pieces into a mixing chamber, introducing sugar crystals into said chamber, mixing said cereal pieces and sugar crystals together, applying a solution containing water and an edible nonsugar binding agent in an amount sufficient to cause the sugar crystals to adhere to the cereal pieces onto the cereal pieces and the crystals as they are being mixed together thereby moistening the pieces and causing the sugar crystals to adhere to said pieces, the moisture content of said moistened cereal pieces ranging from 5–20 percent after they have been sprayed and mixed with the water solution, and reducing the moisture content of the pieces by drying them to an extent that they do not adhere to each other when stored, the moisture content of said dried pieces ranging from about 0.5–3.0 percent.

4. The process of claim 3 wherein loose pieces of sugar are separated from the coated cereal pieces.

5. The process of claim 3 wherein said sugar has a particle size whereby at least 90 percent of it is retained on a 40 mesh screen.

6. The process of claim 3 wherein sucrose is used as the sugar ingredient.

7. The process of claim 3 wherein the amount of sugar in the mixture comprises about 15–60 percent by weight of said mixture.

8. The process of claim 4 wherein the amount of sugar crystals on the dried cereal pieces ranges from about 15–50 percent by weight of the finished product.

9. The process of claim 3 wherein the amount of binding agent in the water solution ranges from about 0.5–25 percent.

10. The process of claim 9 wherein said binding agent is sodium carboxymethylcellulose, and it comprises about 1–5 percent by weight of the solution.